(12) United States Patent
Liao et al.

(10) Patent No.: US 7,837,166 B2
(45) Date of Patent: Nov. 23, 2010

(54) MONITOR CLAMPING DEVICE

(75) Inventors: Hui-Chun Liao, Sanchung (TW);
Ku-Ching Lu, Sanchung (TW);
Yueh-Tsai Weng, Sanchung (TW);
Cheng-Wei Lin, Sanchung (TW)

(73) Assignee: Winmate Communication Inc., Taipei (TW)

( * ) Notice: Subject to any disclaimer, the term of this patent is extended or adjusted under 35 U.S.C. 154(b) by 136 days.

(21) Appl. No.: 12/400,789

(22) Filed: Mar. 9, 2009

(65) Prior Publication Data

US 2010/0224741 A1    Sep. 9, 2010

(51) Int. Cl.
*A47B 96/06* (2006.01)
(52) U.S. Cl. .............................. 248/229.22; 248/231.41; 248/231.61; 248/229.24; 24/523
(58) Field of Classification Search ................... 211/43, 211/184; 24/523; 269/43, 254 CS, 6, 95; 248/228.3, 228.5, 228.6, 228.7, 230.3, 230.5, 248/230.7, 229.25, 229.26, 918, 306, 304, 248/690, 692, 316.4, 316.6, 307, 231.41, 248/231.61, 229.22, 229.14
See application file for complete search history.

(56) References Cited

U.S. PATENT DOCUMENTS

| | | | | |
|---|---|---|---|---|
| 2,062,156 A * | 11/1936 | Zerbst | ........................ | 248/488 |
| 2,193,699 A * | 3/1940 | Sadler | ........................ | 248/307 |
| 2,535,563 A * | 12/1950 | Boyer et al. | ................ | 248/506 |
| 3,053,494 A * | 9/1962 | Stoll | ....................... | 248/228.3 |
| 4,118,003 A * | 10/1978 | Dillow | ....................... | 248/539 |
| 5,685,732 A * | 11/1997 | Lane | .......................... | 439/369 |
| 5,833,189 A * | 11/1998 | Rossman et al. | ....... | 248/231.61 |
| 6,324,729 B1* | 12/2001 | Daubenthaler | ............... | 24/182 |
| 6,370,741 B1* | 4/2002 | Lu | .............................. | 24/523 |
| 7,484,701 B2* | 2/2009 | Hsieh | ........................ | 248/339 |
| 2005/0045785 A1* | 3/2005 | Cohen | ........................ | 248/214 |

* cited by examiner

Primary Examiner—A. Joseph Wujciak, III

(57) ABSTRACT

A monitor clamping device includes a first board having multiple first hooks and a second board having multiple second hooks, the monitor is clamped between the first and second hooks. Multiple first slots are defined in the second board and multiple first guide plates are connected to the first board. The first guide plates movably extend through the first slots. Multiple second guide plates are connected to the second board and engaged with the first guide plates when the first guide plates are moved to a lower end of the first slots. A resilient unit is connected between the first and second board so as to adjust the distance between the first and second hooks. The monitor clamping device can clamp different size monitors.

2 Claims, 6 Drawing Sheets

MONITOR CLAMPING DEVICE

BACKGROUND OF THE INVENTION

1. Field of the Invention

The present invention relates generally to a clamping device, and in particular to a monitor clamping device.

2. The Prior Arts

There are many portable electronic products which provide various different functions to make people's life be easy, convenient and efficient. These electronic products include flat computers, cellular phones, PDAs, and GPS navigators. A clamping device is usually used to fix these products at a position such as on a desk, a counter, a cabinet, a vehicle, or a ship. The clamping device usually connects with a stand such that the user does not need to hold the electronic products while operating them. It is dangerous for a user driving a car and operating the electronic products not to have them being properly fixed.

There are many different types of clamping devices which clamp the monitors by bolts, mortises, or by way of snapping. The use of bolts has a preferred result, but needs tools when fixing a monitor to the clamping device and when removing the monitor from the clamping device. FIG. 1 shows a conventional way to clamp a monitor 810 which includes a first connection portion 811 on a back thereof and the first connection portion 811 can be connected with a second connection portion 822 which is usually connected with a stand 820. The first and second connection portions 811, 822 can be quickly connected to each other, but they cannot provide a solid and reliable clamping function. The monitor 810 is easily loosened and shaken because the first and second connection portions 811, 822 occupy only a small area. FIG. 2 shows another conventional clamping device which includes a frame 92 with a first clamping portion 921 and a second clamping portion 922 which is located to face the first clamping portion 921 at a distance. The monitor (not shown) is slid between the first and second clamping portions 921, 922, and the top and lower ends of the monitor are engaged with the first and second clamping portions 921, 922. However, the frame 92 can only clamp a fixed size monitor.

SUMMARY OF THE INVENTION

A primary objective of the present invention is to provide a monitor clamping device which is reliable and easily operated, and more important is that the clamping device can clamp different size monitors.

A monitor clamping device in accordance with the present invention comprises a first board having multiple first hooks and a second board having multiple second hooks. A restriction unit includes multiple first slots defined in the second board and first guide plates are connected to the first board. The first guide plates movably extend through the first slots. Multiple second guide plates are connected to the second board and located beside the first slots respectively. The first guide plates are engaged with the second guide plates when the first guide plates are moved to a lower end of the first slots. A resilient unit includes multiple first members connected to the first board and multiple second members connected to the second board. Multiple second slots are defined in the second board and each second slot has one of the second members located at a first end thereof and a stop is located at a second end of each second slot. The first members movably extend through the second slots. Multiple resilient members are connected between the first and second members. The first member, the second member and the stop corresponding to each of the second slots are located on a common axis along the second slot. The first and second hooks are located to face to each other at a distance. A cover is mounted to the second board for covering the restriction unit and the resilient unit.

When clamping a monitor, the user may pull the first and second boards away toward opposite directions and the monitor is located between the first and second hooks. The first members are moved along the second slots so that the resilient members are compressed. When releasing the first and second boards, the resilient members apply a force to the first and second boards, and the first and second hooks clamp the monitor located therebetween. When the monitor is removed from the clamping device, the resilient members push the first and second members, and the first and second boards are moved to their original positions. The first members are stopped by the stops and the first guide plates are moved back along the first slots.

The monitor clamping device of the present invention can firmly clamp the monitor without slipping and shaking. The distance between the first and second hooks can be adjusted so that different types of monitors can be clamped. Due to the resilient members, the clamping device does not damage the monitors to be clamped.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
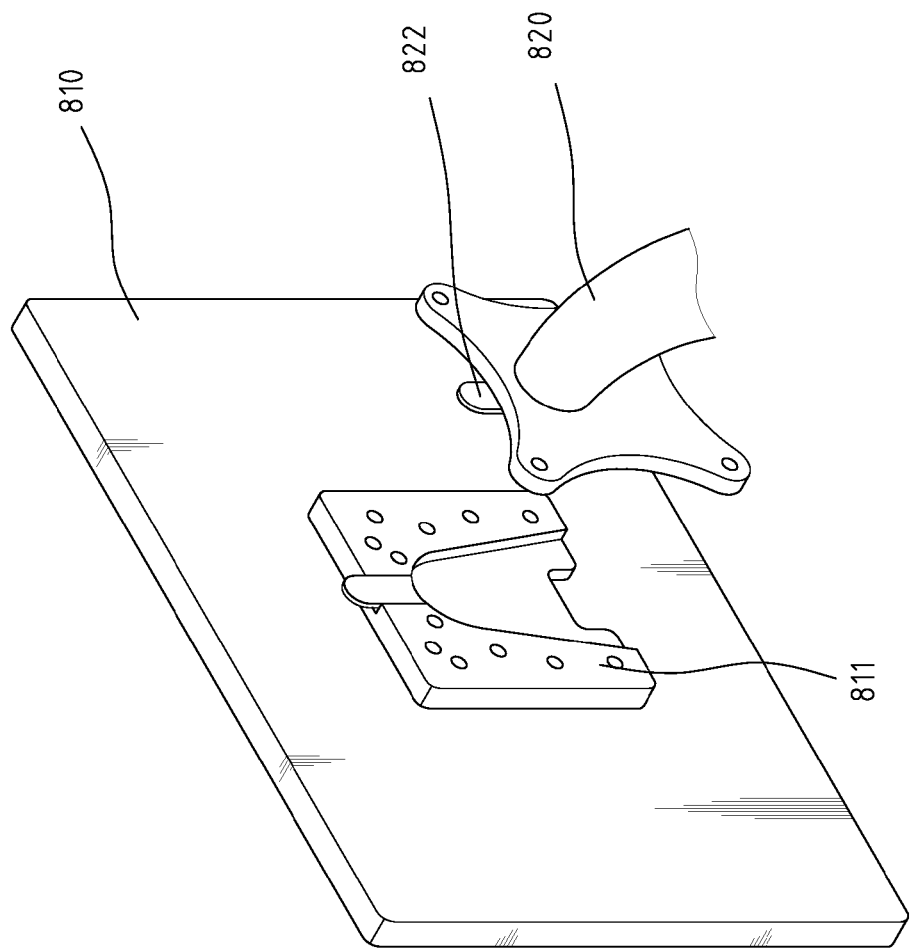
FIG. 1 shows a first conventional monitor clamping device.
Figure 2:
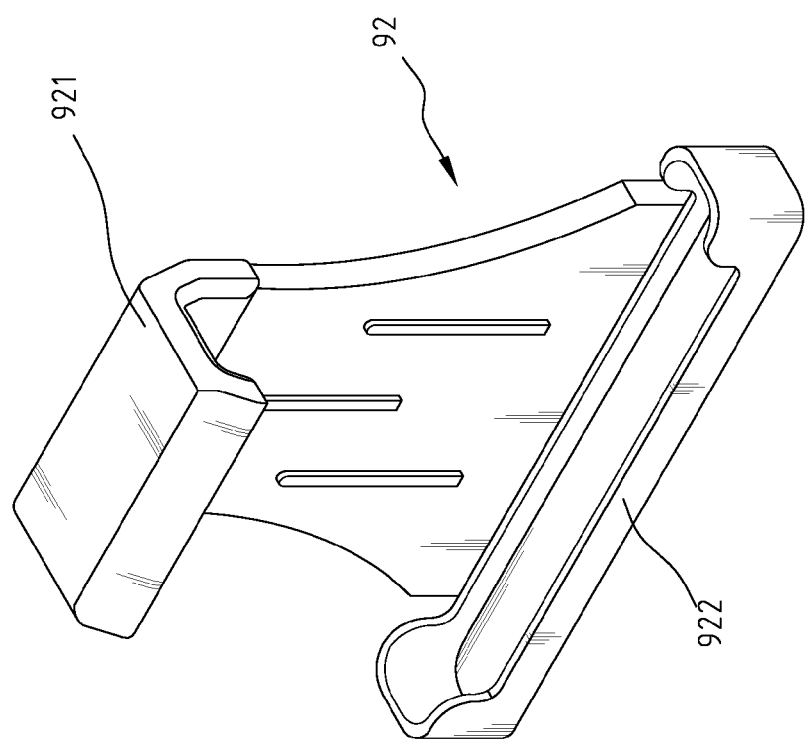
FIG. 2 shows a second conventional monitor clamping device.
Figure 3:
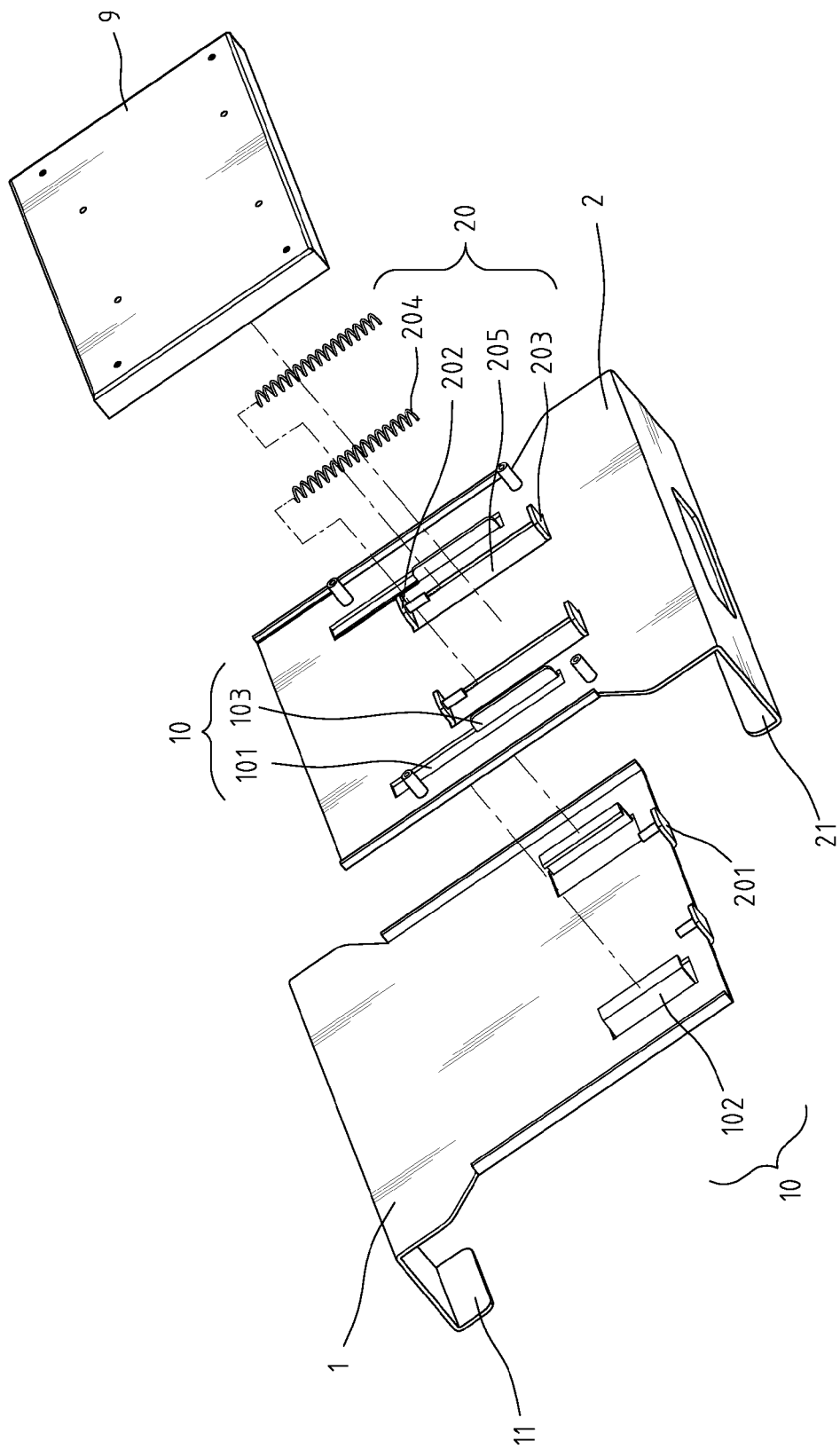
FIG. 3 is an exploded view to show a monitor clamping device in accordance with the present invention.
Figure 4:
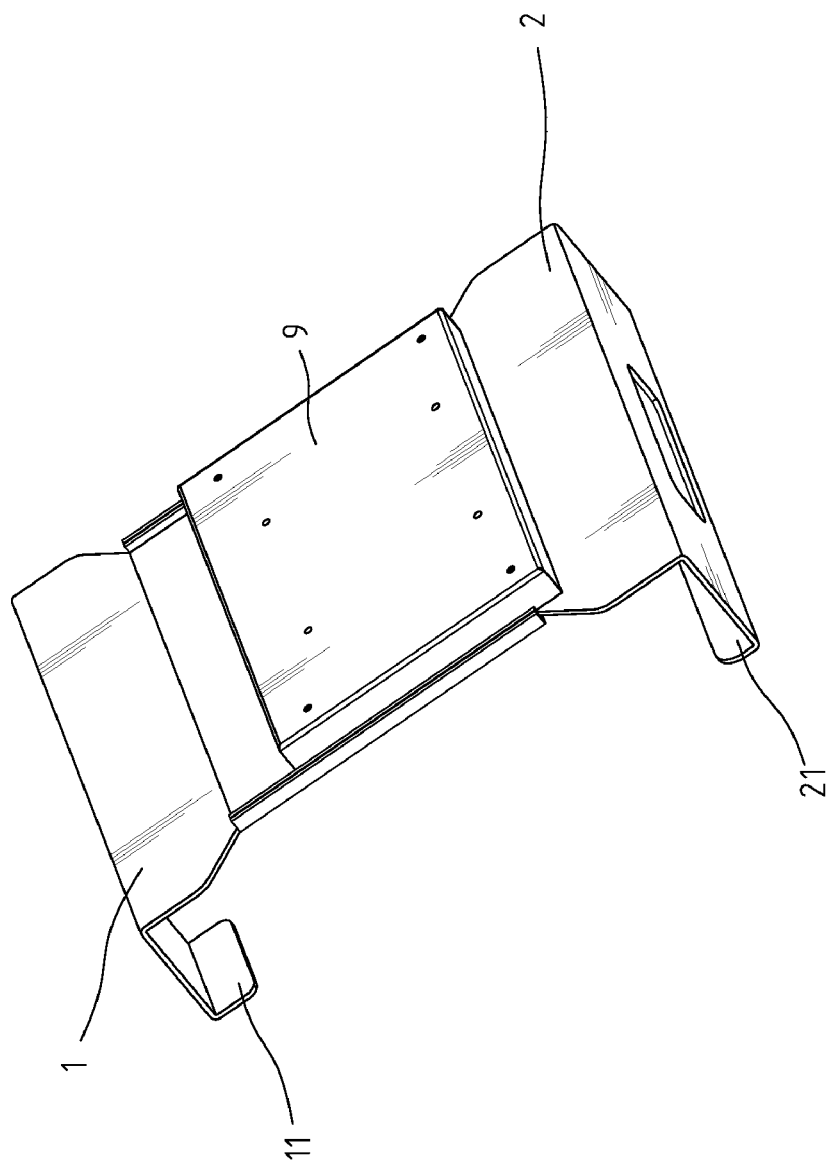
FIG. 4 is a perspective view to show the monitor clamping device of the present invention.
Figure 5:
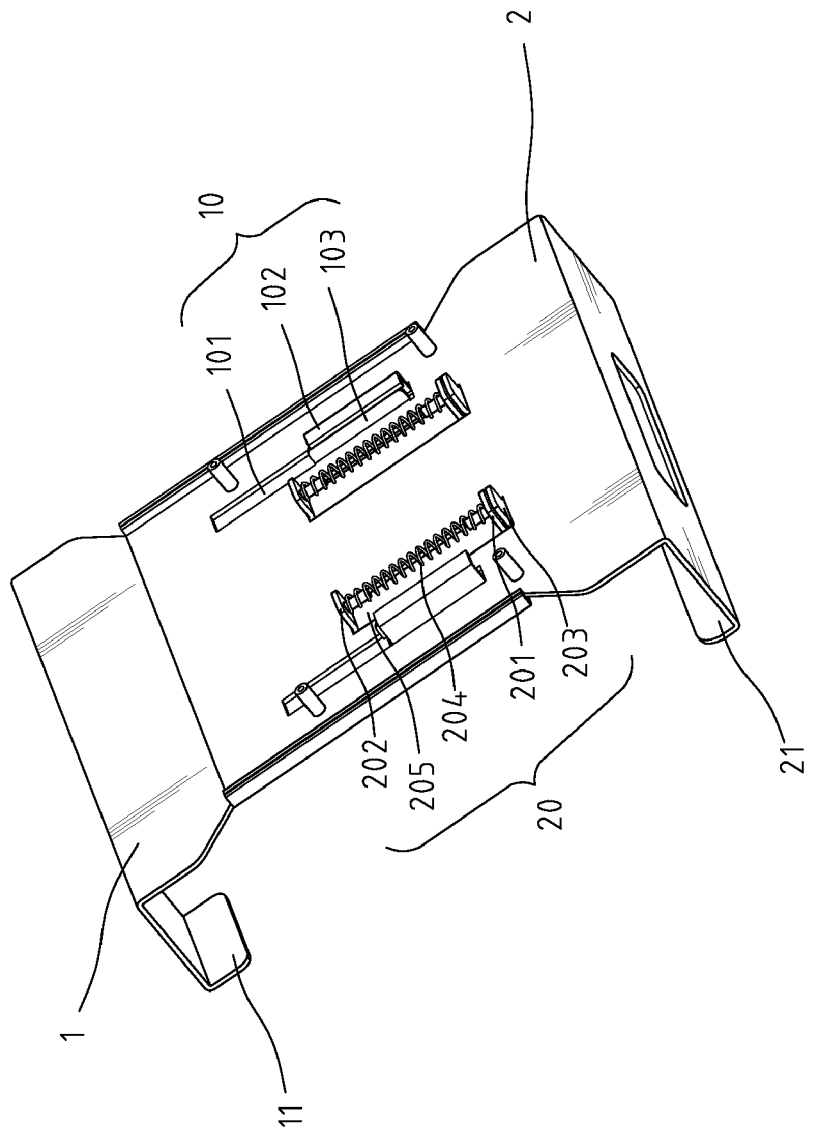
FIG. 5 is a perspective view to show the monitor clamping device of the present invention, wherein the cover is removed.

With reference to the drawings and in particular to FIGS. 3 to 5, a monitor clamping device in accordance with the present invention comprises a first board 1 having multiple first hooks 11 at an end thereof and a second board 2 having multiple second hooks 21 at an end thereof. The first and second hooks 11, 21 face to each other at a distance. A restriction unit 10 includes multiple first slots 101 defined in the second board 2 and first guide plates 102 are connected to the first board 1. The first guide plates 102 movably extend through the first slots 101. Multiple second guide plates 103 are connected to the second board 2 and located beside the first slots 101 respectively. The first guide plates 102 are engaged with the second guide plates 103 when the first guide plates 102 are moved to a lower end of the first slots 101. It is noted that the positions of the first slots 101 can also be defined in the first board 1 and the first guide plates 102 are located on the second board 2. A resilient unit 20 includes multiple first members 201 connected to the first board 1 and multiple second members 202 connected to the second board 2. Multiple second slots 205 are defined in the second board 2 and each second slot 205 has one of the second members 202 located at a first end thereof and a stop 203 is located at a second end of each second slot 205. The first members 201 movably extend through the second slots 205. Multiple resilient members 204 such as springs, hydraulic cylinders or rubbers are connected between the first and second members 201, 202. The first member 201, the second member 202 and the stop 203 corresponding to each of the second slots 205 are located on a common axis along the second slot 205. A cover 9 is mounted to the second board 2 for covering the restriction unit 10 and the resilient unit 20. The cover 9 can be connected to a stand which is not shown.

Figure 6:
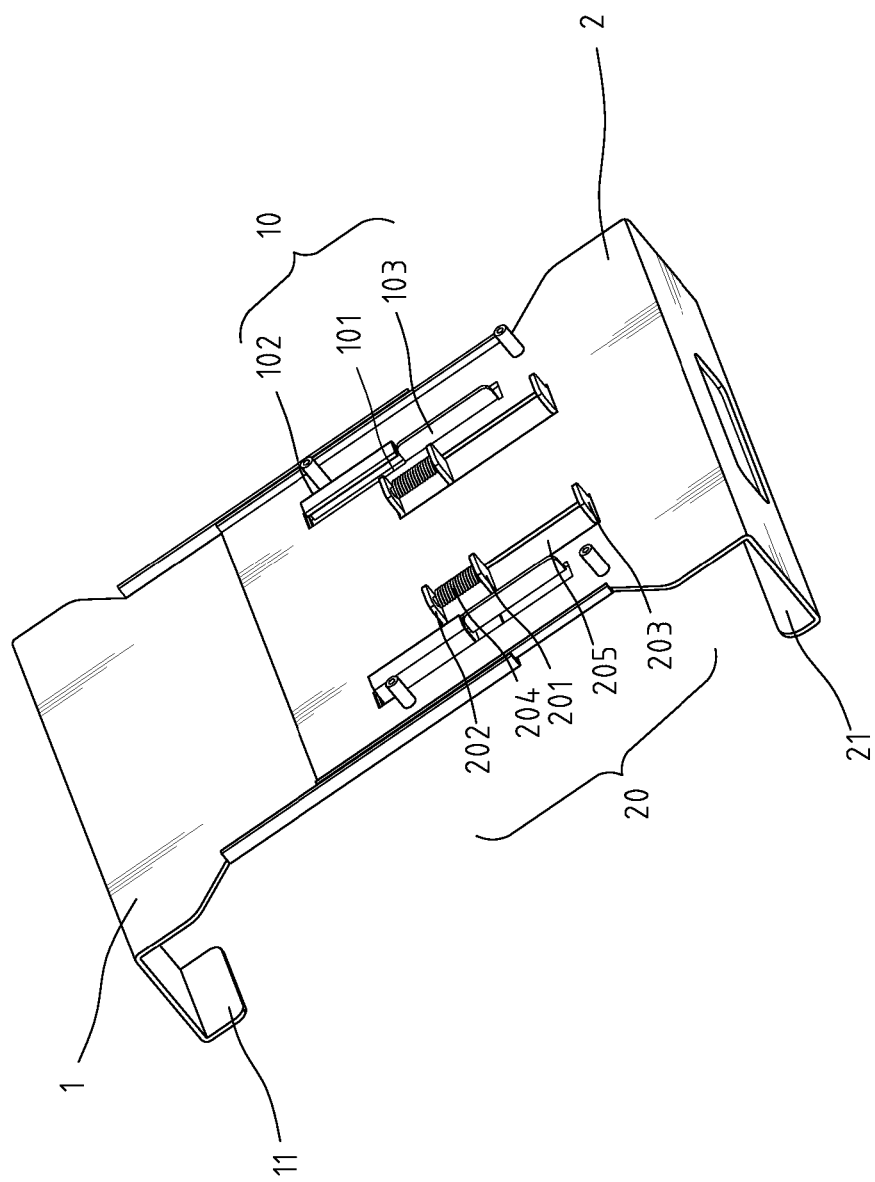
FIG. 6 is a perspective view to show the monitor clamping device of the present invention, wherein the first and second boards are pulled away toward opposite directions.

Further referring to FIG. 6, when clamping a monitor (not shown), the user may hold the first and second hooks 11, 21 and pull the first and second boards 1, 2 away toward opposite directions. The monitor to be clamped is located between the first and second hooks 11, 21. The first guide plates 102 move along the first slots 101. The first members 201 move along the second slots 205 and are cooperated with the second members 202 to compress the resilient members 204, which store a force to push the first and second members 201, 202 backward. Therefore, the monitor is clamped between the first and second hooks 11, 21. When the user removes the monitor, the resilient members 204 keep pushing the first and second members 201, 202 so that the first and second hooks 11, 21 are moved back to their original positions. The first members 201 are stopped by the stops 203 and the first guide plates 102 move back along the first slots 101.

The clamping device of the present invention can be used on ships or vehicles to firmly clamp the monitor. The operation of the clamping device is easy and simple, and various size monitors can be clamped by the clamping device.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A monitor clamping device for mounting on variety size of monitors, comprising:
   a first board having multiple first hooks at an end thereof;
   a second board having multiple second hooks at an end thereof;
   a restriction unit having multiple first slots defined in the second board and first guide plates connected to the first board, the first guide plates movably extending through the first slots, multiple second guide plates connected to the second board and located beside the first slots respectively, the first guide plates being engaged with the second guide plates when the first guide plates are moved to a lower end of the first slots;
   a resilient unit having multiple first members connected to the first board, and multiple second members connected to the second board, multiple second slots defined in the second board and each second slot having one of the second members located at a first end thereof and a stop located at a second end of each second slot, the first members movably extending through the second slots, multiple resilient members connected between the first and second members, wherein the first member, the second member and the stop corresponding to each of the second slots being located on a common axis along the second slot, the first and second hooks being located to face to each other at a distance; and
   a cover mounted to the second board for covering the restriction unit and the resilient unit, the cover being able to connect with a stand.

2. The monitor clamping device as claimed in claim 1, wherein the resilient member is a spring.

* * * * *